United States Patent
Li et al.

(10) Patent No.: US 9,753,643 B2
(45) Date of Patent: Sep. 5, 2017

(54) PROJECTION SCREEN, REMOTE CONTROL TERMINAL, PROJECTION DEVICE, DISPLAY DEVICE, PROJECTION SYSTEM AND REMOTE CONTROL METHOD FOR PROJECTION SYSTEM

(71) Applicant: BOE TECHNOLOGY GROUP CO., LTD., Beijing (CN)

(72) Inventors: Yaohui Li, Beijing (CN); Xiaohua Feng, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 386 days.

(21) Appl. No.: 14/429,765

(22) PCT Filed: Apr. 22, 2014

(86) PCT No.: PCT/CN2014/075874
§ 371 (c)(1),
(2) Date: Mar. 26, 2015

(87) PCT Pub. No.: WO2015/109671
PCT Pub. Date: Jul. 30, 2015

(65) Prior Publication Data
US 2016/0034183 A1    Feb. 4, 2016

(30) Foreign Application Priority Data
Jan. 24, 2014    (CN) .......................... 2014 1 0033778

(51) Int. Cl.
*G06F 3/0354*    (2013.01)
*G06F 3/0489*    (2013.01)
(Continued)

(52) U.S. Cl.
CPC ......... *G06F 3/04892* (2013.01); *G03B 21/56* (2013.01); *H04N 5/44582* (2013.01);
(Continued)

(58) Field of Classification Search
CPC ................................................. G06F 3/03542
(Continued)

(56) References Cited

U.S. PATENT DOCUMENTS 7,232,229 B2    6/2007    Peeters et al.

FOREIGN PATENT DOCUMENTS

| CN | 101000520 | 7/2007 |
|---|---|---|
| CN | 101208738 | 6/2008 |

(Continued)

OTHER PUBLICATIONS

Office Action in Chinese Patent Application No. 201410033778.2, dated Sep. 8, 2015.
(Continued)

*Primary Examiner* — Michael Pervan
(74) *Attorney, Agent, or Firm* — Brooks Kushman P.C.

(57) ABSTRACT

The projection screen includes signal lines, photosensitive sensors and a signal processor. The photosensitive sensor is configured to sense a light beam for determining a remote control region from a remote control terminal. The signal line is configured to transmit to the signal processor the sensing signal generated by the photosensitive sensor after sensing the light beam. The signal processor is configured to determine position information about a position irradiated by the light beam. The display device can determine the remote control region in accordance with the position information determined by the signal processor about the position irradiated by the light beam, and receive an operation command from a command key of the remote control terminal so as to perform a remote control operation.

7 Claims, 4 Drawing Sheets

(51) Int. Cl.
 *G03B 21/56* (2006.01)
 *H04N 5/445* (2011.01)
 *H04N 9/31* (2006.01)
 *H04N 5/44* (2011.01)

(52) U.S. Cl.
 CPC ......... *H04N 9/3188* (2013.01); *H04N 9/3194* (2013.01); *G03B 2206/00* (2013.01); *G06F 2203/04801* (2013.01); *H04N 2005/443* (2013.01); *H04N 2005/4426* (2013.01); *H04N 2005/44586* (2013.01)

(58) Field of Classification Search
 USPC .......................................... 345/158, 180–183
 See application file for complete search history.

(56) References Cited

FOREIGN PATENT DOCUMENTS

| | | |
|---|---|---|
| CN | 201369800 | 12/2009 |
| CN | 102445998 | 5/2012 |
| CN | 202306503 | 7/2012 |
| CN | 102956098 | 3/2013 |
| CN | 102968210 | 3/2013 |
| JP | 2006253772 | 9/2006 |

OTHER PUBLICATIONS

International Search Report and Written Opinion in PCT International Application No. PCT/CN2014/075874, dated Nov. 2, 2014.
International Search Report issued in corresponding International Application No. PCT/CN2014/075874 dated Nov. 2, 2014.
Office Action issued in corresponding Chinese Application No. 2014100337782 dated Mar. 23, 2015.

PROJECTION SCREEN, REMOTE CONTROL TERMINAL, PROJECTION DEVICE, DISPLAY DEVICE, PROJECTION SYSTEM AND REMOTE CONTROL METHOD FOR PROJECTION SYSTEM

CROSS-REFERENCE TO RELATED APPLICATIONS

The present application is the U.S. National Phase of International Application No. PCT/CN2014/075874, filed on Apr. 22, 2014, and claims priority to Chinese patent application No. 201410033778.2, filed on Jan. 24, 2014, which are incorporated herein by reference in their entirety.

TECHNICAL FIELD

The present disclosure relates to the field of touch technology, in particular to a projection screen, a remote control terminal, a projection device, a display device, a projection system and a remote control method for the projection system.

BACKGROUND

Along with the rapid development of remote control technologies, remote control products have been applied in a wider range.

As a passive display system, a projection system can project an image displayed by a display device onto a projection screen through a projection device, and change contents displayed on the projection screen by changing contents displayed on the display device. Along with the development of the remote control technologies, a long-distance remote control technology will inevitably be applied in the projection system.

In the projection system using the long-distance remote control technology, it is able to remotely control the projection device and the display device, but it is unable to remotely control the projection screen.

SUMMARY

An object of the present disclosure is to provide a projection screen, a remote control terminal, a projection device, a display device, a projection system and a remote control method for the projection system, so as to overcome such a drawback in an existing projection system that it is unable to remotely control the projection screen.

In one aspect, the present disclosure provides in one embodiment a projection screen which is provided with signal lines arranged in a crosswise manner, photosensitive sensors electrically connected to the signal lines, and a signal processor for receiving sensing signals from the signal lines. The photosensitive sensor is configured to sense a light beam for determining a remote control region emitted from a remote control terminal. The signal line is configured to transmit to the signal processor the sensing signal generated by the photosensitive sensor after sensing the light beam. The signal processor is configured to determine position information about a position irradiated by the light beam sensed by the photosensitive sensor in accordance with the sensing signal from the signal line, and transmit the position information to a designated device.

According to the projection screen in this embodiment, the photosensitive sensor may sense the light beams with specific wavelengths emitted from the remote control terminal and a projection device, the sensing signal generated by the photosensitive sensor after sensing the light beam may be transmitted to the signal processor via the signal line, and the signal processor may determine the corresponding position information in accordance with the received sensing signal and transmit the position information to the corresponding device. As a result, it is able to determine the remote control region in accordance with the position information determined by the signal processor about the position irradiated by the light beam that is sensed by the photosensitive sensor, thereby to remotely control the projection screen in accordance with a command from the remote control terminal and facilitate the user's remote control and touch control operation.

Alternatively, the designated device includes a display device and/or a projection device. The signal processor is specifically configured to transmit the position information to the designated device, so that the designated device determines the remote control region in accordance with the position information.

Alternatively, the photosensitive sensor is further configured to sense a light beam for determining a display region emitted from the projection device, and the signal processor is further configured to transmit to the projection device position information about a position irradiated by the light beam emitted from the projection device and sensed by the photosensitive sensor, so as to enable the projection device to determine the display region in accordance with the position information about the position irradiated by the light beam emitted from the projection device and sensed by the photosensitive sensor, thereby to flexibly adjust the display region on the projection screen.

Further, the signal lines include signal lines arranged in a horizontal direction and signal lines arranged in a vertical direction, so as to determine the position information in a more accurate manner.

In another aspect, the present disclosure provides in one embodiment a remote control terminal including a light-beam emitter configured to emit a light beam with a predetermined wavelength to the projection screen and a command key configured to transmit an operation command to the display device.

According to the remote control terminal in this embodiment of the present disclosure, the light beam with the predetermined wavelength is emitted by the light-beam emitter to the projection screen; the projection screen senses the light beam with the determined wavelength, determines the position information about the position irradiated by the light beam and transmits the position information to the display device, so that the display device determines the remote control region; the operation command is transmitted to the display device by the command key so that the display device performs the corresponding operations. As a result, it is able to achieve the remote control.

The remote control terminal further includes a switch configured to control whether or not to emit the light beam to the projection screen by the remote control terminal. Through the switch, it is able to effectively control the emission of the light beam by the remote control terminal, and the switch is turned off when it is unnecessary to emit the light beam, so as to save energy.

Alternatively, the light-beam emitter is specifically configured to emit visible and/or invisible light beams to the projection screen.

Alternatively, the remote control terminal further includes a switch configured to control whether or not to emit the light beam to the projection screen by the remote control terminal.

According to the remote control terminal in an embodiment of the present disclosure, the light-beam emitter may emit the visible light beam to the projection screen, so that a user can determine a direction of the light beam from the light-beam emitter in accordance with the visible light beam, and the light-beam emitter may also emit the invisible light beam to the projection screen so as to determine a position irradiated by the light beam from the light-beam emitter.

In yet another aspect, the present disclosure provides in one embodiment a projection device, including:

a light-beam emitter configured to emit a light beam with a predetermined wavelength to a projection screen; and a controller configured to control the light beam from the light-beam emitter in accordance with position information from the projection screen so as to form a display region with a predetermined shape on the projection screen, the position information being about a position irradiated by the light beam emitted by the projection device and sensed by a photosensitive sensor.

According to the projection device in the embodiment of the present disclosure, the light-beam emitter emits the light beam with the predetermined wavelength to the projection screen, and the controller controls the light beam from the light-beam emitter in accordance with the position information about the position irradiated by the light beam feedback from the projection screen, so as to form the display region with the predetermined shape on the projection screen, thereby to flexibly adjust the display region on the projection screen.

The light-beam emitter is specifically configured to emit to the projection screen a light beam with a first wavelength which can be sensed by the photosensitive sensor on the projection screen, so as to display a relevant display content; and emit to the projection screen a light beam with a second wavelength which can be sensed by the photosensitive sensor on the projection screen, so as to determine the display region, wherein the light beam with the second wavelength is irradiated on the projection screen at a periphery of the display region where the display content is displayed, and a predetermined pattern is formed by sequentially connecting positions irradiated by the light beams with the second wavelength.

Alternatively, at least one light-beam emitter is arranged at each of four corners of the projection device.

The light beams with different wavelengths are emitted from the light-beam emitter, so as to distinguish the projection light beams for displaying the display content from the adjustment light beams for adjusting the display region. In an embodiment of the present disclosure, the light beams with the first wavelength cannot be sensed by the photosensitive sensor, so they may be used for the projection and display. The light beams with the second wavelength can be sensed by the photosensitive sensor and irradiated at the periphery of the display region, and the predetermined pattern may be formed by sequentially connecting the positions irradiated the light beams with the second wavelength. As a result, it is able to enable the projection device to flexibly adjust the display region in accordance with the positions irradiated by the light beams with the second wavelength and enable the pattern formed by sequentially connecting the positions irradiated by the light beams at the periphery of the display region to be the predetermined pattern, thereby to adjust the display region in a simpler and more accurate manner.

In still yet another aspect, the present disclosure provides in one embodiment a display device, including:

a transceiver configured to acquire position information about a position irradiated by a light beam emitted by a remote control terminal and sensed by a photosensitive sensor on a projection screen, and receive an operation command from a command key of the remote control terminal; and a processor configured to determine a remote control region in accordance with the position information received by the transceiver, and perform a remote control operation in accordance with the operation command.

According to the display device in this embodiment of the present disclosure, the transceiver receives the position information about the position irradiated by the light beam from the projection screen and receives the operation command from the command key of the remote control terminal. The processor determines the remote control region in accordance with the received position information, and performs the corresponding operation in accordance with the operation command from the remote control terminal. As a result, it is able to remotely control the projection screen, thereby to facilitate the user's remote control and touch control operation.

Further, the processor is specifically configured to:

determine a display scale of a display content displayed by the display device and the display content displayed at a display region in accordance with the number of signal lines included in the display region of the projection screen and a resolution of the display device;

determine a mapping relationship between a position of the display content displayed on the projection screen and a position of the display content displayed on the display device in accordance with the display scale; and determine whether or not the position irradiated by a light beam emitted from the remote control terminal and sensed by the photosensitive sensor is within a region covered by an icon or a widget displayed in the display content in accordance with the position information and the mapping relationship, if yes, determine the icon or widget as the remote control region, and if no, display a cursor at a position corresponding to the position irradiated by the light beam emitted from the remote control terminal and sensed by the photosensitive sensor, and determine a region covered by the cursor as the remote control region.

The processor is further configured to display a spot at the position irradiated by the light beam emitted from the remote control terminal and sensed by the projection screen, so that a user can easily determine a position pointed by the light beam from the remote control terminal when a visible light beam cannot be identified on the projection screen.

In still yet another aspect, the present disclosure provides in one embodiment a projection system, including a projection device, a projection screen, a remote control terminal and a display device. The projection device is configured to emit a light beam with a predetermined wavelength to the projection screen, so as to project a relevant content displayed by the display device onto the projection screen. The projection screen is configured to receive the light beam from the projection device and a light beam for determining a remote control region from the remote control terminal, and transmit position information about positions irradiated by the light beams to display device. The remote control terminal is configured to emit the light beam with a predetermined wavelength to the projection screen, and transmit an operation command to the display device. The display device is configured to determine the remote control region in accordance with the position information determined by the projection screen about the position irradiated by the light beam emitted from the remote control terminal, and perform a remote control operation in accordance with the operation command from the remote control terminal.

According to the projection system in this embodiment of the present disclosure, the projection screen receives the light beams with the specific wavelengths from the remote control terminal and the projection device, and determines the position information about the positions irradiated by the corresponding light beams, so that the display device can determine the remote control region in accordance with the position information determined by the projection screen about the position irradiated by the light beam from the remote control terminal and perform the remote control operation in accordance with the operation command from the remote control terminal. As a result, it is able to remotely control the projection screen, thereby to facilitate the user's remote control and touch control operation.

Alternatively, the projection device is specifically configured to:

emit a light beam with a first wavelength for displaying the relevant content to the projection screen, the light beam with the first wavelength being a light beam that cannot be sensed by a photosensitive sensor on the projection screen; and emit a light beam with a second wavelength for determining a display region to the projection screen, and form the display region with a predetermined shape on the projection screen in accordance with the position information about a position irradiated by the light beam with the second wavelength from the projection device.

The projection screen is specifically configured to receive the light beam with the first wavelength, so as to display the relevant content displayed by the display device; and receive the light beam with the second wavelength and transmit the position information about the position irradiated by the received light beam with the second wavelength to the projection device, so as to enable the projection device to determine the display region in accordance with the position information about the position irradiated by the light beam with the second wavelength.

Through the light beams with different wavelengths emitted by the projection device to the projection screen, it is able to achieve the projection and display of the relevant content displayed by the display device, and flexibly adjust the display region on the projection screen.

In still yet another aspect, the present disclosure provides in one embodiment a remote control method for a projection system. The projection system includes a projection device, a projection screen, a remote control terminal and a display device. The remote control method includes:

transmitting, by the projection screen, first position information about a position irradiated by a light beam for determining a display region to the projection device when the projection screen receives the light beam from the projection device;

determining, by the projection device, a display region where a relevant display content is displayed on the projection screen in accordance with the first position information;

establishing, by the display device, a mapping relationship between a position of the display content on the projection screen and a position of the display content on the display device in accordance with the determined display region;

transmitting, by the projection screen, second position information about a position irradiated by a light beam for determining a remote control region to the display device when the projection screen receives the light beam from the remote control terminal;

determining, by the display device, the remote control region in accordance with the second position information and the mapping relationship; and performing, by the display device, a remote control operation in accordance with an operation command when the display device receives the operation command from the remote control terminal.

Alternatively, the first position information is about a position irradiated by the light beam sensed by a photosensitive sensor of the projection screen and being at a periphery of a region where the display content is located.

Alternatively, the projection screen determines a region where a predetermined pattern formed by connecting the positions irradiated by the light beams at the periphery of the region where the display content is located as the display region.

Alternatively, the mapping relationship between the position of the display content on the projection screen and the position of the display content on the display device may be determined by the display device by:

acquiring the number of signal lines arranged in a horizontal direction and the number of signal lines arranged in a vertical direction included in the display region;

determining a display scale of the display content displayed completely at the display region in accordance with the number of the signal lines and a resolution of the display device; and determining the mapping relationship between the position of the display content on the projection screen and the position of the display content on the display device in accordance with the determined display scale.

Alternatively, the remote control region may be determined by the display device in accordance with the received second position information and the mapping relationship by:

determining whether or not a second position at the display region is within a region covered by any icon or widget in the display content in accordance with the second position information and the mapping relationship, if yes, determining by the display device the icon or widget as the remote control region, and if not, displaying by the display device a cursor at a position of the display region corresponding to the second position and determining a region covered by the cursor as the remote control region.

Alternatively, the projection screen may further transmit the second position information to the projection device so that the projection device determines the remote control region and transmits it to the display device.

DETAILED DESCRIPTION

The present disclosure will be described hereinafter in a clear and complete manner in conjunction with the drawings and embodiments. Obviously, the following embodiments are merely a part of, rather than all of, the embodiments of the present disclosure. Based on these embodiments, a person skilled in the art may obtain the other embodiments without any creative effort, and the resultant embodiments also fall within the scope of the present disclosure.

Figure 1:
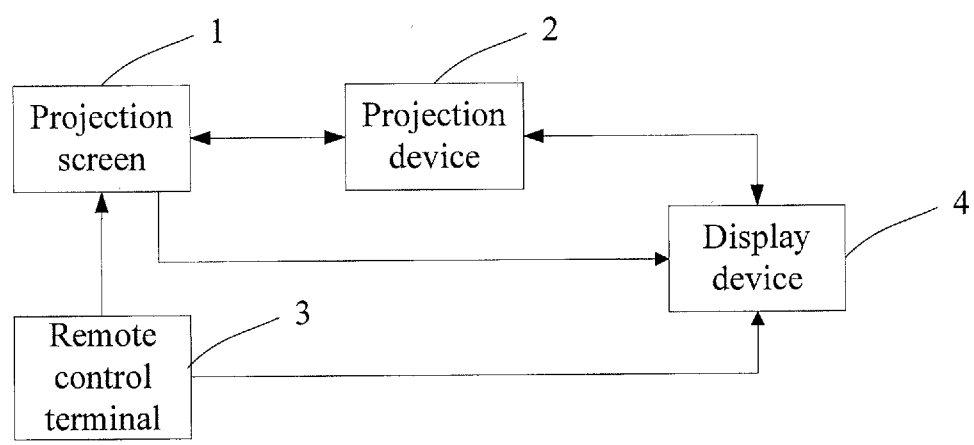
FIG. 1 is a block diagram of a projection system according to one embodiment of the present disclosure.

As shown in FIG. 1, a projection system includes a projection screen 1, a projection device 2, a remote control terminal 3 and a display device 4.

To be specific, the projection device 2 is configured to emit a light beam with a predetermined wavelength to the projection screen 1, so as to project a relevant content displayed on the display device 4 onto the projection screen 1. The projection screen 1 is configured to receive the light beam from the projection device 2 so as to display the relevant content displayed on the display device, and further configured to receive a light beam for determining a remote control region from the remote control terminal 3 so as to determine position information about a position irradiated by the light beam from the remote control terminal. The remote control terminal 3 is configured to emit the light beam with a predetermined wavelength to the projection screen 1, and transmit an operation command to the display device 4. The display device 4 is configured to determine the remote control region in accordance with the position information determined by the projection screen 1 about the position irradiated by the light beam from the remote control terminal 3, and perform a remote control operation in accordance with the operation command from the remote control terminal 3.

Further, the projection device 2 in this embodiment is specifically configured to emit a light beam with a first wavelength for displaying the relevant display content to the projection screen 1, the light beam with the first wavelength being a light beam that cannot be sensed by a photosensitive sensor arranged on the projection screen; and emit a light beam with a second wavelength for determining a display region to the projection screen 1, and form the display region with a predetermined shape on the projection screen 1 in accordance with the position information about a position irradiated by the light beam with the second wavelength from the projection device 2. The projection screen 1 is specifically configured to receive the light beam with the first wavelength, so as to display the display content displayed by the display device 4, thereby to achieve the projection and display of the display content on the display device; and receive the light beam with the second wavelength and transmit the position information about the position irradiated by the received light beam with the second wavelength to the projection device 2, so as to enable the projection device 2 to determine the display region in accordance with the position information about the position irradiated by the light beam with the second wavelength, thereby to flexibly adjust the display region on the projection screen.

Figure 2A:
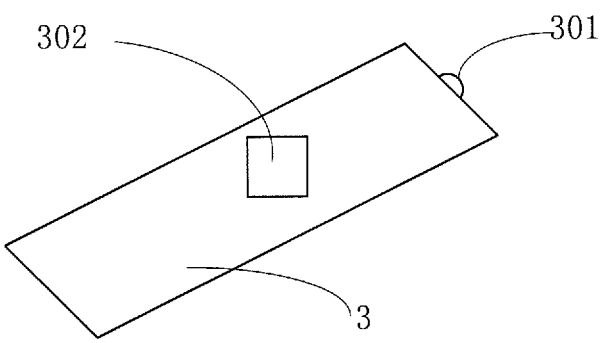
FIGS. 2A to 2B are schematic views showing a remote control terminal according to one embodiment of the present disclosure.

To be specific, the remote control terminal 3 in this embodiment can transmit the operation command to the display device 4, and emit the light beam with a specific wavelength for determining the remote control region to the projection screen 1. As shown in FIG. 2A, the remote control terminal 3 includes a light-beam emitter 301 configured to emit the light beam with a predetermined wavelength to the projection screen and a command key 302 configured to transmit the operation command to the display device 4.

The remote control terminal 3 in this embodiment differs from an ordinary remote control terminal in that it includes the light-beam emitter 301. The light-beam emitter 301 may be arranged at, but not limited to, a top of the remote control terminal. The light-beam emitter 301 may be arranged at other part of the remote control terminal. The light beam emitted by the light-beam emitter 301 of the remote control terminal 3 can be sensed by the photosensitive sensor on the display screen.

Alternatively, the light-beam emitter 301 of the remote control terminal 3 may emit visible and/or invisible light beams. The visible light beam can be identified by user's eyes, so that a user can determine a direction of the light beam. However, in order to prevent the position irradiated by the light beam for determining the remote control region from the remote control terminal from being adversely affected by the visible light beam, the visible light beam is set in such a way that it cannot be sensed by the photosensitive sensor on the projection screen. The invisible light beam can be sensed by the photosensitive sensor on the projection screen, and the position information about the position irradiated by the invisible light beam can be determined on the projection screen, so as to determine the remote control region.

Figure 2B:
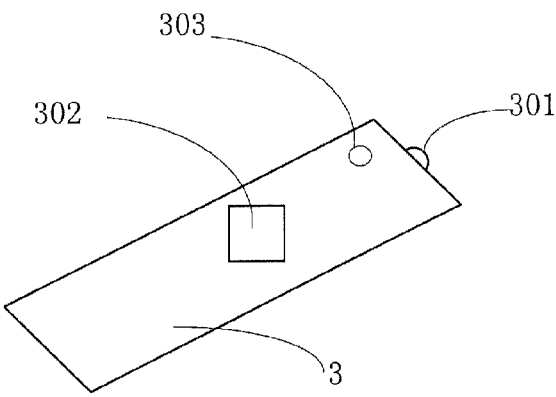

Further, in this embodiment, the remote control terminal 3 may be provided with a switch 303 configured to control whether or not to emit the light beam for determining the remote control region to the projection screen, as shown in FIG. 2B. When it is required to remotely control the content displayed on the projection screen, the switch 303 is turned on, and when it is unnecessary to perform the remote control operation, the switch 303 is turned off so as to save energy.

Furthermore, the remote control terminal 3 in this embodiment includes the command key 302. After determining the remote control region, the user may operate the command key 302 so as to transmit the operation command to the display device. In this embodiment, the user may determine the remote control region in accordance with the position on the projection screen irradiated by the visible light beam from the remote control terminal, or in accordance with a position of a spot displayed at the position irradiated by the light beam from the light-beam emitter 301 of the remote control terminal under the control of the display device. After determining that the position irradiated by the visible light beam, or the position where the spot is located, is just the remote control region where the remote control operation is to be performed, the user may directly press the command key 302, so as to transmit the operation command by the remote control terminal.

Figure 3:
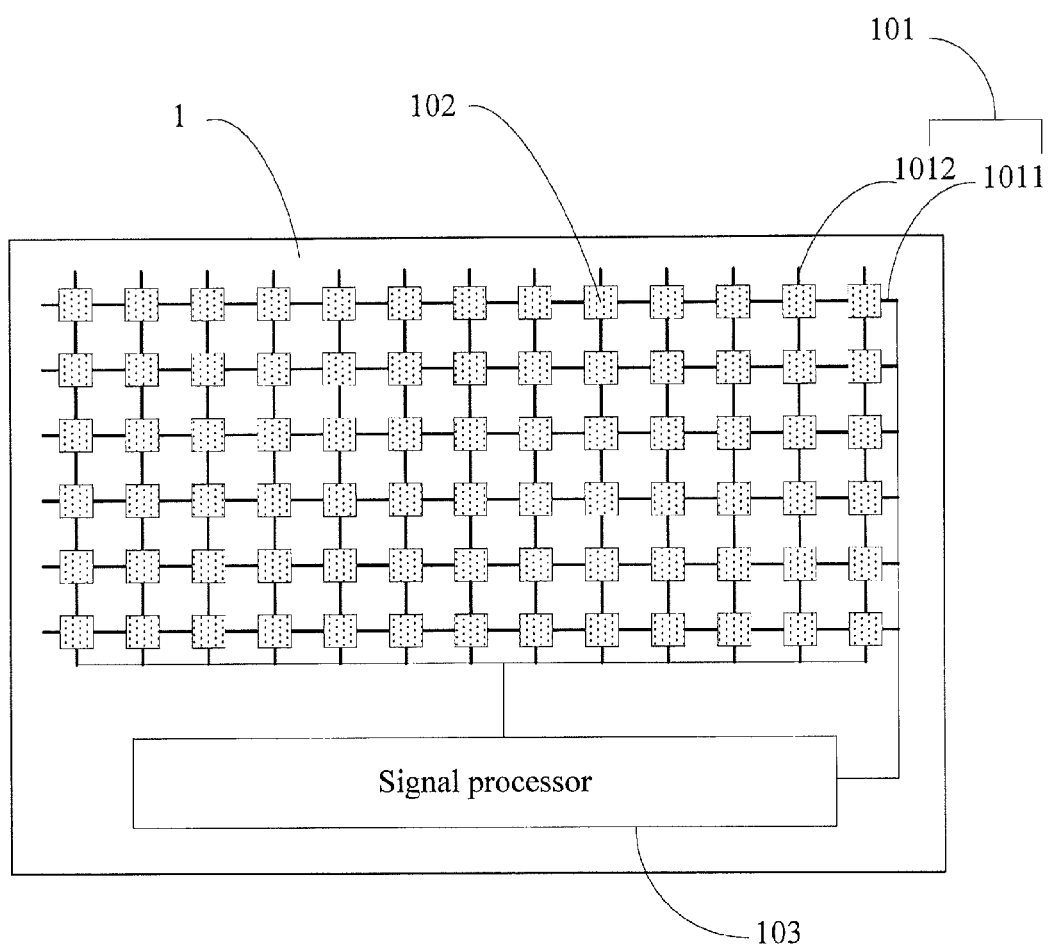
FIG. 3 is a schematic view showing a projection screen according to one embodiment of the present disclosure.

In the embodiments, the display content displayed by the display device 4 may be displayed on the projection screen 1 through the projection device 2. The projection screen 1 further includes several signal lines 101, several photosensitive sensors 102 and a signal processor 103, as shown in FIG. 3.

To be specific, the signal lines 101 are arranged in a crosswise manner, and electrically connected to the photosensitive sensors 102. Alternatively, the signal lines 101 are arranged in a grid form. The photosensitive sensor 102 is arranged at each joint of the grid and electrically connected to the signal line 101, so as to determine the position information accurately.

Further, in the embodiments, the photosensitive sensor 102 may be arranged at a surface of the projection screen 1, so as to sense the light beam with the predetermined wavelength irradiated thereon. The light beam may be that for determining the remote control region and being irradiated from the remote control terminal 3 or that for determining the display region and being irradiated from the projection device 2. After the photosensitive sensor 102 is irradiated by the light beam with the predetermined wavelength, its electrical parameters (capacitance, resistance, voltage, etc.) are changed, and these changes are transmitted to the signal processor 103 via the signal line 101 in the form of a sensing signal.

Alternatively, the signal lines in the embodiments of the present disclosure include signal lines 1011 arranged in a horizontal direction and signal lines 1012 arranged in a vertical direction. The signal lines 1011 and the signal lines 1012 are arranged in a crisscross manner, i.e., in a grid form, so that the signal processor 103 can determine the position irradiated by the light beam in a more accurate manner, as shown in FIG. 3.

The signal processor 103 is configured to receive the sensing signal from the signal line 101, determine the position information about the position irradiated by the light beam sensed by the photosensitive sensor in accordance with the sensing signal, and transmit the determined position information to a designated device.

To be specific, the signal processor 103 is electrically connected to the signal lines 101 arranged in a crisscross manner, receives the sensing signal generated by the photosensitive sensor 102 after being irradiated by the light beam, determines the position information about the position irradiated by the light beam sensed by the photosensitive sensor in accordance with the sensing signal, and then transmits the position information to the display device 4 and/or the projection device 2.

In the embodiments of the present disclosure, the display device 4 may be provided with an element capable of determining the remote control region in accordance with the relevant position information from the signal processor 103, so that the display device 4 can determine the remote control region in accordance with the position information about the position irradiated by the light beam emitted from the remote control terminal and sensed by the photosensitive sensor.

In the embodiments of the present disclosure, the projection device 2 may be provided with an element capable of determining the remote control region in accordance with the relevant position information from the signal processor 103, so that the projection device 2 can transmit the determined remote control region to the display device, through the data communication between the projection device and the display device 4, for the subsequent remote control operation.

Alternatively, the photosensitive sensor 102 may sense the light beam for determining the display region from the projection device 2. The signal processor 103 receives from the signal line 101 the sensing signal generated by the photosensitive sensor 102 after sensing the light beam from the projection device 2, determines the position information about the position irradiated by the light beam sensed by the photosensitive sensor in accordance with the sensing signal, and transmits the determined position information to the projection device 2, so that the projection device 2 can determine the display region in accordance with the position information about the position irradiated by the light beams emitted from the projection device 2 and sensed by the photosensitive sensor 102.

The signal processor 103 may transmit the position information to the display device 4 and/or the projection device 2 in a wireless or wired manner.

Figure 4:
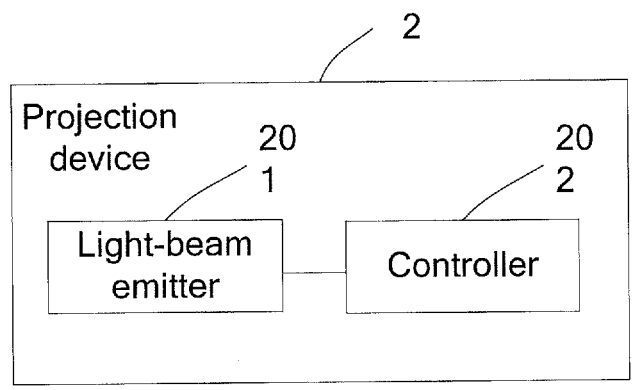
FIG. 4 is a block diagram of a projection device according to one embodiment of the present disclosure.

In the embodiments of the present disclosure, the projection device 2 includes a light-beam emitter 201 and a controller 202, as shown in FIG. 4.

To be specific, the light-beam emitter 201 is configured to emit a light beam with a predetermined wavelength to the projection screen. The controller 202 is configured to control the light beam emitted from the light-beam emitter 201 in accordance with the position information from the signal processor 103 of the projection screen 1 about the position irradiated by the light beam emitted from the projection device 2 and sensed by the photosensitive sensor 102, so as to form the display region with a predetermined shape on the projection screen 1.

Alternatively, at least one light-beam emitter 201 is provided at each of four corners of the projection device 2, so as to improve a projection effect.

Alternatively, the light beams emitted by the light-beam emitter 201 of the projection device 2 may include a light beam with a first wavelength for displaying the relevant display content and a light beam with a second wavelength for determining the display region, the light beam with the first wavelength and the light beam with the second wavelength are emitted to the projection screen 1.

To be specific, the light beam with the first wavelength cannot be sensed by the photosensitive sensor 102 on the projection screen 1, and it is used to display the relevant display content displayed by the display device 4 on the projection screen 1. The light beam with the second wavelength can be sensed by the photosensitive sensor 102 on the projection screen 1, and it is located at the periphery of the display region where the display content is displayed. The predetermined pattern is formed by sequentially connecting the positions irradiated by the light beams with the second wavelength.

To be specific, in an embodiment, the light beam with the second wavelength can be sensed by the photosensitive sensor 102 on the projection screen so as to generate a sensing signal, which is then transmitted via the signal line 101 to the signal processor 103. The signal processor can determine the corresponding position information in accordance with the received sensing signal, and transmit the position information to the controller 202 of the projection device 2. After receiving the position information, the controller 202 can control the light beam from the light-beam emitter 201 in accordance with the position information, so as to form the display region with the predetermined shape on the projection screen 1.

Alternatively, the predetermined shape includes a rectangle, or any other forms, and it is not particularly defined in the embodiments of the present disclosure. Alternatively, the predetermined shape is a rectangle, i.e., the display region on the projection screen 1 is of a rectangular shape. This rectangular shape may be easily adjusted to be in a predetermined proportion to the display content displayed on the display device 4, so as to determine a mapping relationship between a position of the display content on the projection screen 1 and a position of the display content on the display device 4 in a better manner, thereby to determine the remote control region accurately.

Through the light beams with the second wavelength that are located at the periphery of the display region and that can be sensed by the photosensitive sensors on the projection screen, it is able to flexibly adjust the display region on the projection screen.

Figure 5:
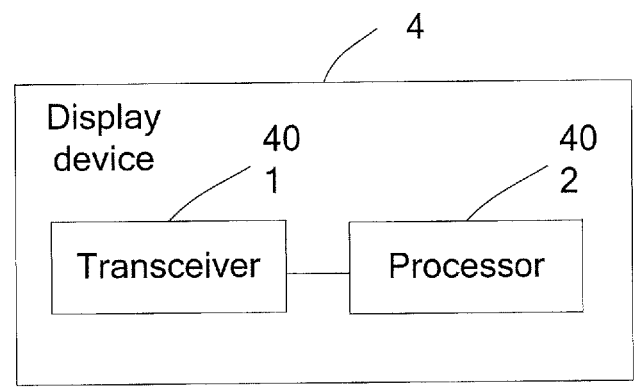
FIG. 5 is a block diagram of a display device according to one embodiment of the present disclosure.

In an embodiment, the display device 4 includes a transceiver 401 and a processor 402, as shown in FIG. 5. To be specific, the transceiver 401 is configured to acquire the position information transmitted from the signal processor 103 of the projection screen 1 about the position irradiated by the light beam emitted from a remote control terminal 3 and sensed by a photosensitive sensor 102, and receive the operation command from the command key 302 of the remote control terminal 3. The processor 402 is configured to determine the remote control region in accordance with the position information received by the transceiver 401, and perform the remote control operation in accordance with the received operation command.

To be specific, the processor 402 may establish the mapping relationship between the position of the relevant display content on the projection screen 1 and the position of the relevant display content on the display device 4 in accordance with the display region projected from the projection device onto the projection screen 1.

To be specific, the processor 402 may establish the above mapping relationship by:

A: acquiring the number of the signal lines 1011 arranged in the horizontal direction and the number of the signal lines 1012 arranged in the vertical direction at the display region of the projection screen 1;

B: determining a display scale of the display content displayed completely at the display region of the projection screen 1 in accordance with the number of the signal lines 1011 arranged in the horizontal direction, the number of the signal lines 1012 arranged in the vertical direction and the resolution of the display device; and C: determining the mapping relationship between the position of the display content on the projection screen and the position of the display content on the display device in accordance with the determined display scale.

Furthermore, the processor 402 may determine the remote control region in accordance with the position information received by the transceiver 401 by:

determining whether or not the position irradiated by the light beam emitted from the remote control terminal 3 and sensed by the photosensitive sensor 102 is within a region covered by any icon or widget in the display content in accordance with the received position information and the determined mapping relationship, if yes, determining the icon or widget as the remote control region, and if no, displaying a cursor at a position corresponding to the position irradiated by the light beam emitted from the remote control terminal 3 and sensed by the photosensitive sensor 102 and determining a region covered by the cursor as the remote control region.

Alternatively, in an embodiment, in order to facilitate the user to determine whether or not the position irradiated by the light beam for determining the remote control region from the remote control terminal 3 is the desired position, the processor 402 is further configured to display a spot at the position irradiated by the light beam emitted from the remote control terminal 3 and sensed by the projection screen 1. Through displaying the spot on the projection screen, it is able to prevent such a trouble caused when the visible light beam for determining the display region is of a color similar to that of the display content displayed on the projection screen 1.

According to the projection system in an embodiment, the projection screen is provided with the photosensitive sensors capable of sensing the light beams with the specific wavelengths from the remote control terminal and the projection device. The sensing signal generated by the photosensitive sensor after sensing the light beam is transmitted via the signal line to the signal processor. The signal processor determines the corresponding position information in accordance with the sensing signal and transmits the corresponding position information to the display device and the projection device, so that the display device can determine the remote control region in accordance with the received position information and perform the remote control operation in accordance with the operation command from the remote control terminal. As a result, it is able to remotely control the projection screen, thereby to facilitate the user's operation.

Figure 6:
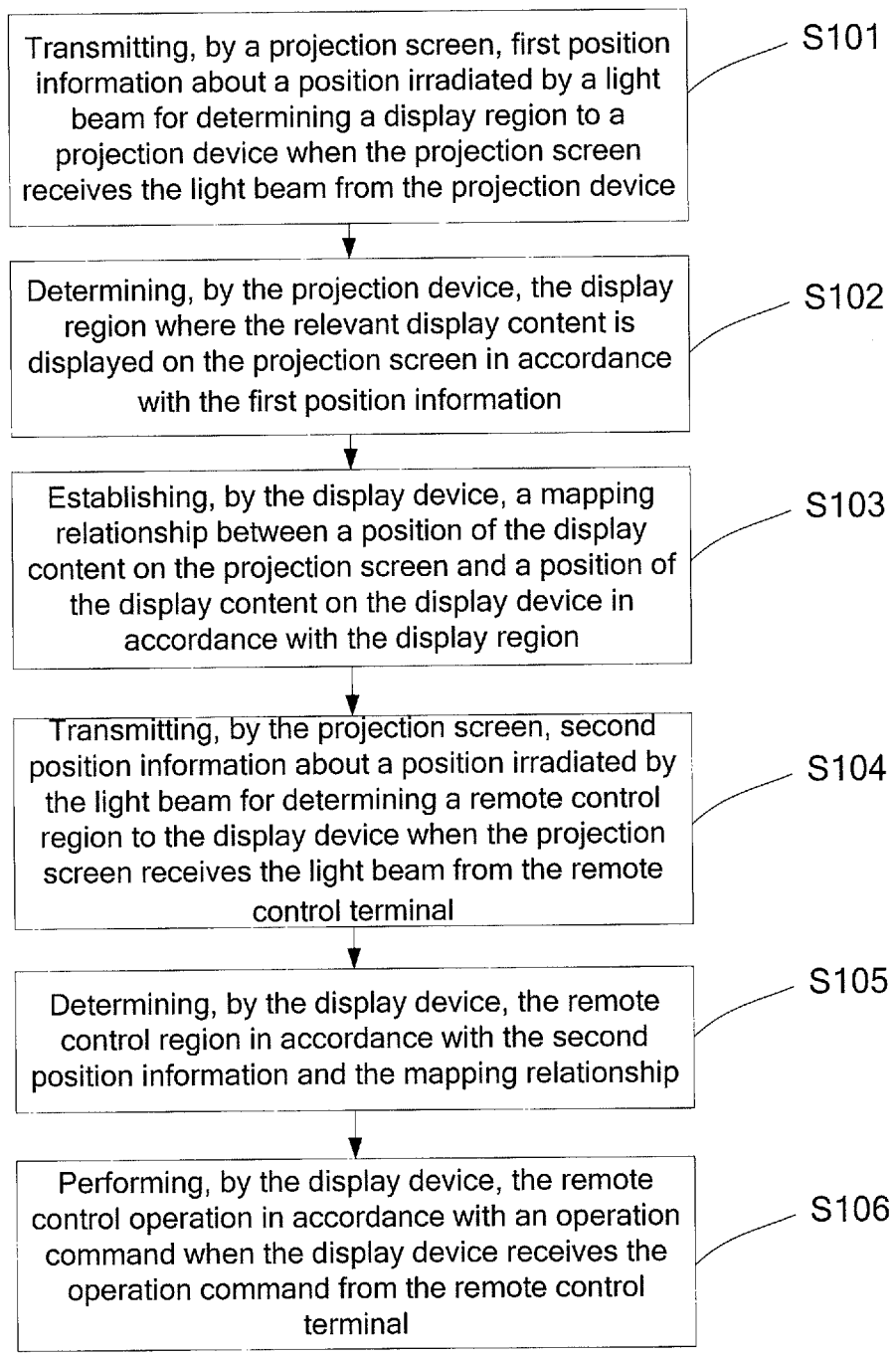
FIG. 6 is a flow chart of a remote control method according to one embodiment of the present disclosure.

Based on the above projection system, the present disclosure further provides in one embodiment a remote control method which, as shown in FIG. 6, includes the following steps.

S101: transmitting, by the projection screen, first position information about a position irradiated by the light beam for determining the display region to the projection device when the projection screen receives the light beam from the projection device. Alternatively, the first position information is about a position irradiated by the light beam which is sensed by the photosensitive sensor of the projection screen and at a periphery of a region where the display content is located.

S102: determining, by the projection device, the display region where the relevant display content is displayed on the projection screen in accordance with the first position information. Alternatively, the first position information is about a position irradiated by the light beam which is sensed by the photosensitive sensor of the projection screen and at a periphery of a region where the display content is located. The projection device determines a region with a predetermined pattern formed by connecting the positions irradiated by the light beams at the periphery of the region where the display content is located as the display region.

S103: establishing, by the display device, the mapping relationship between the position of the display content on the projection screen and the position of the display content on the display device in accordance with the display region determined in S102.

To be specific, the mapping relationship between the position of the display content on the projection screen and the position of the display content on the display device may be determined by:

A: acquiring the number of the signal lines arranged in the horizontal direction and the number of the signal lines arranged in the vertical direction at the display region of the projection screen;

B: determining the display scale of the display content displayed completely at the display region of the projection screen in accordance with the number of the signal lines arranged in the horizontal direction, the number of the signal lines arranged in the vertical direction and the resolution of the display device; and C: determining the mapping relationship between the position of the display content on the projection screen and the position of the display content on the display device in accordance with the determined display scale.

S104: transmitting, by the projection screen, second position information about a position irradiated by the light beam for determining the remote control region to the display device when the projection screen receives the light beam from the remote control terminal.

S105: determining, by the display device, the remote control region in accordance with the second position information and the mapping relationship.

Alternatively, the remote control region may be determined in accordance with the second position information and the mapping relationship by:

determining whether or not a second position at the display region is within a region covered by any icon or widget in the display content in accordance with the second position information and the mapping relationship, if yes, determining by the display device the icon or widget as the remote control region, and if no, displaying by the display device a cursor at a position corresponding to the second position at the display region and determining a region covered by the cursor as the remote control region.

Of course, in an embodiment, the projection screen may also transmit the second position information to the projection device, and the projection device determines the remote control region and then transmits it to the display device.

S106: performing, by the display device, the remote control operation in accordance with the operation command when the display device receives the operation command from the remote control terminal.

In an embodiment, the operation command is implemented by operating the command key of the remote control terminal. The operation command includes any command capable of being issued from such a terminal as touch panel, e.g., by clicking, double clicking, pressing for a long period of time, or sliding from a start position toward the respective directions. A clicking instruction may be implemented by pressing the command key once, a double-clicking instruction may be implemented by pressing the command key twice, and a sliding operation may be implemented by keeping the command key pressed and then sliding. The corresponding operations may be performed by the display device in accordance with the above operation commands, e.g., a corresponding application is activated by double clicking an icon, a page turning operation is performed by sliding from right to left, and a region covered by sliding is enlarged by sliding from the bottom up.

Further, after determining the remote control region, it may be highlighted by the display device. For example, the remote control region may be displayed in an obvious color, in a hatched manner, or in a color greatly different from a color of an original content at the remote control region, so as to enable the user to conveniently determine whether or not the remote control region is the desired one.

The remote control procedure of the projection system will be described hereinafter in conjunction of the practical application.

In an embodiment, the display device is a display with an intelligent operating system, the projection device is a projector, the remote control terminal is a remote controller, and the projection screen is a projection screen having the above-mentioned functions. In addition, the display can be connected to a network, and the projection screen is in wireless communication with the remote controller.

Step 1: the display and the projector are started, so as to display various graphical interfaces, e.g., "TV", "music" and "picture", displayed by the display on the projection screen.

Step 2: the remote controller is turned on so as to control the light-beam emitter of the remote controller to emit the visible light beam and/or invisible light beam to the projection screen. In this embodiment, the invisible light beam is a light beam with a specific wavelength that can be sensed by the photosensitive sensor on the projection screen.

Step 3: when the photosensitive sensor on the projection screen senses the invisible light beam, its electrical parameters (capacitance, resistance, voltage, etc.) change, and the position information about a position where the change occurs, i.e., the position irradiated by the light beam, is then transmitted via the signal lines arranged in a matrix form to the display with the intelligent operating system.

In an embodiment, after the photosensitive sensor senses the light beam, the position irradiated by the light beam may be determined by acquiring the position where the change occurs via the signal lines arranged in a matrix form (the signal lines are arranged in crisscross manner, where a transverse direction represents an X axis and a longitudinal direction represents a Y axis of a horizontal coordinate system), so as to determine coordinate information about the position irradiated by the light beam, and then the cursor or widget at the coordinate may be determined in accordance with the coordinate information.

Step 4: the display with the intelligent operating system determines the remote control region in accordance with the position information.

In an embodiment, the display with the intelligent operating system determines the display region where the icon or widget at the coordinate corresponding to the position information is displayed as the remote control region in accordance with the position information from the projection screen. Further, the display with the intelligent operating system may display a spot (or shadow) at the position where the determined remote control region is located, so as to enable the user to know the position on the projection screen where the remote controller points.

Step 5: when the display with the intelligent operating system receives the operation command from the remote controller, it performs the remote control operation in accordance with the operation command.

For example, when the invisible light beam is irradiated at the icon "music", the position information of the icon "music" is transmitted to the display with the intelligent operating system, and the display determines the display region corresponding to the icon "music" as the remote control region. At this time, if the user clicks the command key 302 of the remote controller, a clicking operation is performed on the icon "music" and a music database is visited. A plurality of icons for songs is displayed in a pagination manner (from left to right, it is displayed on page 1, page 2, page 3 and so on, and one page is displayed each time). When the user keeps the command key pressed so as to move the invisible light beam emitted by the remote controller from right to left on the projection screen, an image on the page (e.g., on page 1) displayed on the current projection screen moves from right to left and finally disappears, and then the icons on page 2 is displayed on the projection screen. This procedure is similar to a procedure of sliding a finger on a screen of a smart phone. At this time, if the user does not click the command key but moves the remote controller to emit the invisible light beam to the icon "picture" and then clicks the command key, the clicking operation is performed on the icon "picture".

According to the projection screen, the projection device, the projection system and the remote control method of the embodiments of the present disclosure, the projection screen is provided with the photosensitive sensors capable of sensing the light beams with the specific wavelengths from the remote control terminal and the projection device. The sensing signal generated by the photosensitive sensor after sensing the light beam is transmitted via the signal line to the signal processor. The signal processor determines the corresponding position information in accordance with the sensing signal and transmits it to the display device and the projection device, so that the display device can determine the remote control region in accordance with the received position information and achieve the remote control operation in accordance with the operation command from the remote control terminal. As a result, it is able to remotely control the projection screen, thereby to facilitate the user's remote control and touch control operation.

The above are merely the preferred embodiments of the present disclosure. Obviously, a person skilled in the art may make further modifications and alterations without departing from the spirit and scope of the present disclosure. If these modifications and alterations fall within the scope of the appended claims and the equivalents thereof, the present disclosure also intends to include them.

What is claimed is:

1. A display device, comprising:
a transceiver configured to acquire position information about a position irradiated by a light beam emitted by a remote control terminal and sensed by a photosensitive sensor on a projection screen, and receive an operation command from the remote control terminal; and
a processor configured to determine a remote control region in accordance with the position information received by the transceiver, and perform a remote control operation in accordance with the operation command,
wherein the processor is configured to:
determine a display scale of a display content displayed by the display device and the display content displayed at a display region in accordance with the number of signal lines included in the display region of the projection screen and a resolution of the display device;
determine a mapping relationship between a position of the display content displayed on the projection screen and a position of the display content displayed on the display device in accordance with the display scale; and
determine whether or not the position irradiated by a light beam emitted from the remote control terminal and sensed by the photosensitive sensor is within a region covered by an icon or a widget displayed in the display content in accordance with the position information and the mapping relationship, if yes, determine the icon or widget as the remote control region, and if no, display a cursor at a position corresponding to the position irradiated by the light beam emitted from the remote control terminal and sensed by the photosensitive sensor, and determine a region covered by the cursor as the remote control region.

2. A remote control method for a projection system which comprises a projection device, a projection screen, a remote control terminal and a display device, the remote control method comprising:
transmitting, by the projection screen, first position information about a position irradiated by a light beam for determining a display region to the projection device when the projection screen receives the light beam from the projection device;
determining, by the projection device, a display region where a relevant display content is displayed on the projection screen in accordance with the first position information;
establishing, by the display device, a mapping relationship between a position of the display content on the projection screen and a position of the display content on the display device in accordance with the determined display region;
transmitting, by the projection screen, second position information about a position irradiated by a light beam for determining a remote control region to the display device when the projection screen receives the light beam from the remote control terminal;
determining, by the display device, the remote control region in accordance with the second position information and the mapping relationship; and
performing, by the display device, a remote control operation in accordance with an operation command when the display device receives the operation command from the remote control terminal.

3. The remote control method according to claim 2, wherein the first position information is about a position irradiated by the light beam sensed by a photosensitive sensor of the projection screen and being at a periphery of a region where the display content is located.

4. The remote control method according to claim 3, wherein the projection screen determines a region where a predetermined pattern formed by connecting the positions irradiated by the light beams at the periphery of the region where the display content is located as the display region.

5. The remote control method according to claim 2, wherein the mapping relationship between the position of the display content on the projection screen and the position of the display content on the display device is determined by the display device by:
acquiring the number of signal lines arranged in a horizontal direction and the number of signal lines arranged in a vertical direction included in the display region;
determining a display scale of the display content displayed completely at the display region in accordance with the number of the signal lines and a resolution of the display device; and
determining the mapping relationship between the position of the display content on the projection screen and the position of the display content on the display device in accordance with the determined display scale.

6. The remote control method according to claim 2, wherein the remote control region is determined by the display device in accordance with the received second position information and the mapping relationship by:
determining whether or not a second position at the display region is within a region covered by any icon or widget in the display content in accordance with the second position information and the mapping relationship, if yes, determining by the display device the icon or widget as the remote control region, and if no, displaying by the display device a cursor at a position of the display region corresponding to the second position and determining a region covered by the cursor as the remote control region.

7. The remote control method according to claim 2, wherein the projection screen further transmits the second position information to the projection device so that the projection device determines the remote control region and transmits it to the display device.

* * * * *